July 30, 1963   L. P. VITT ETAL   3,099,824
STATIC LOGIC ANNUNCIATOR
Filed May 26, 1958   4 Sheets-Sheet 1
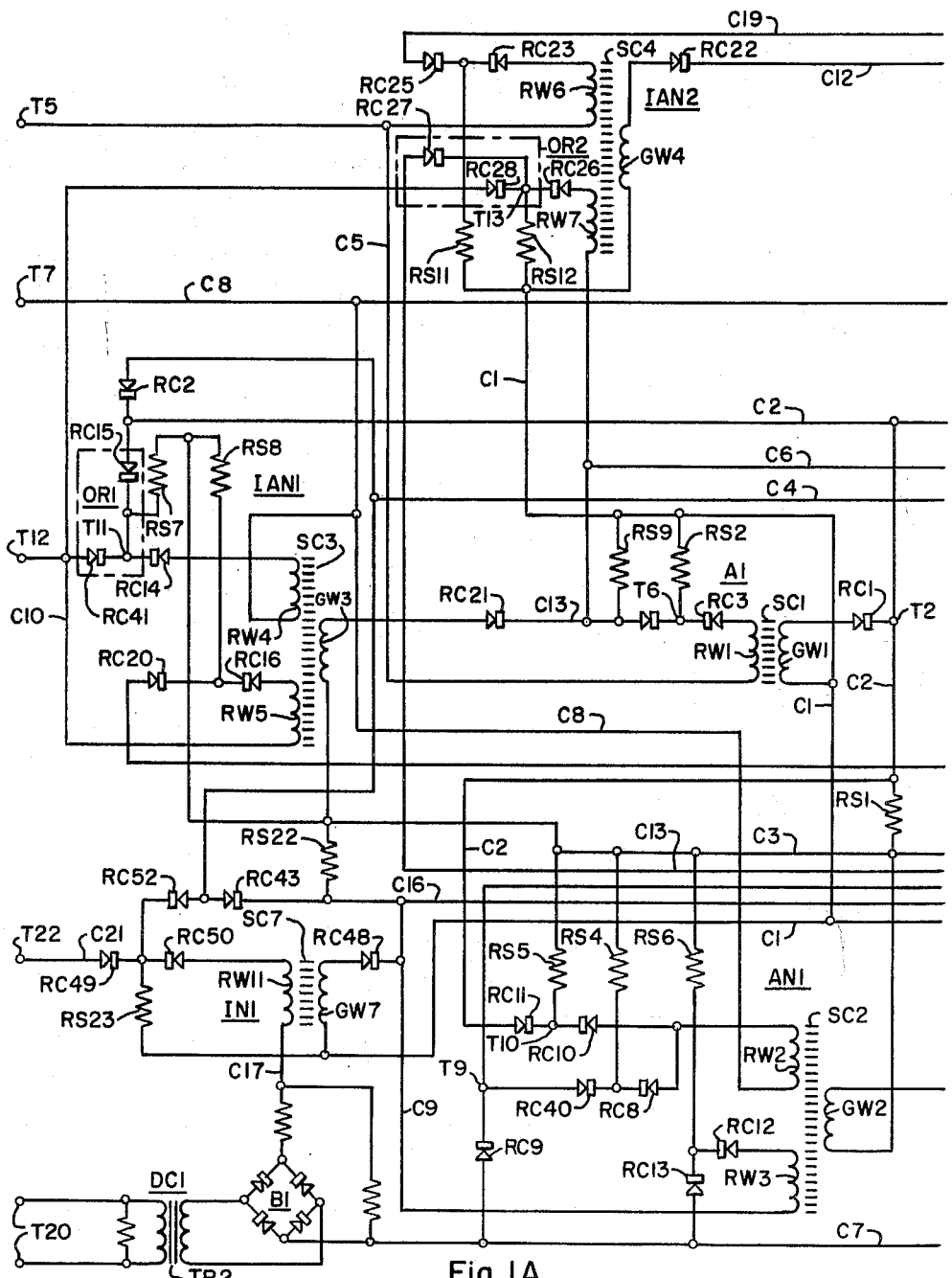
Fig. IA.
WITNESSES:
Bernard R. Gieguey
Ralph W. McIntire
INVENTORS
Leonard P. Vitt and
Jon J. McNeill.
BY Ralph W. Surrey
ATTORNEY Fig. 2.
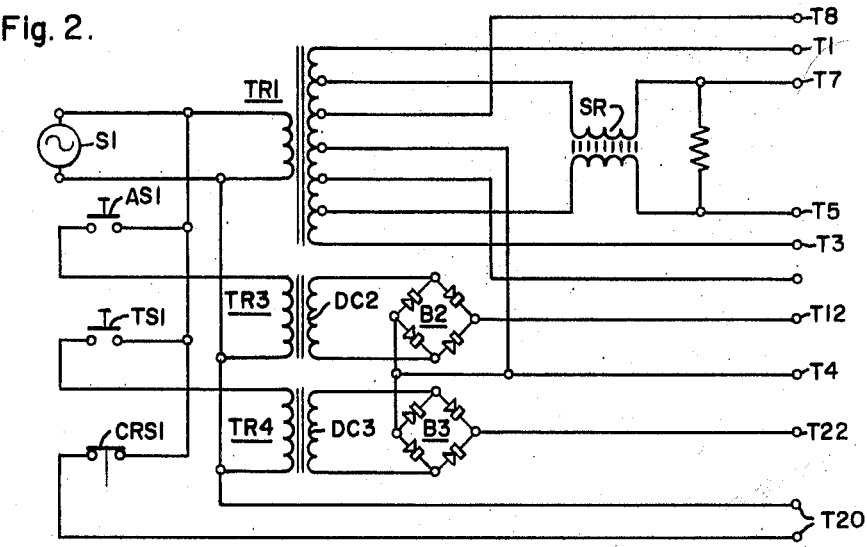
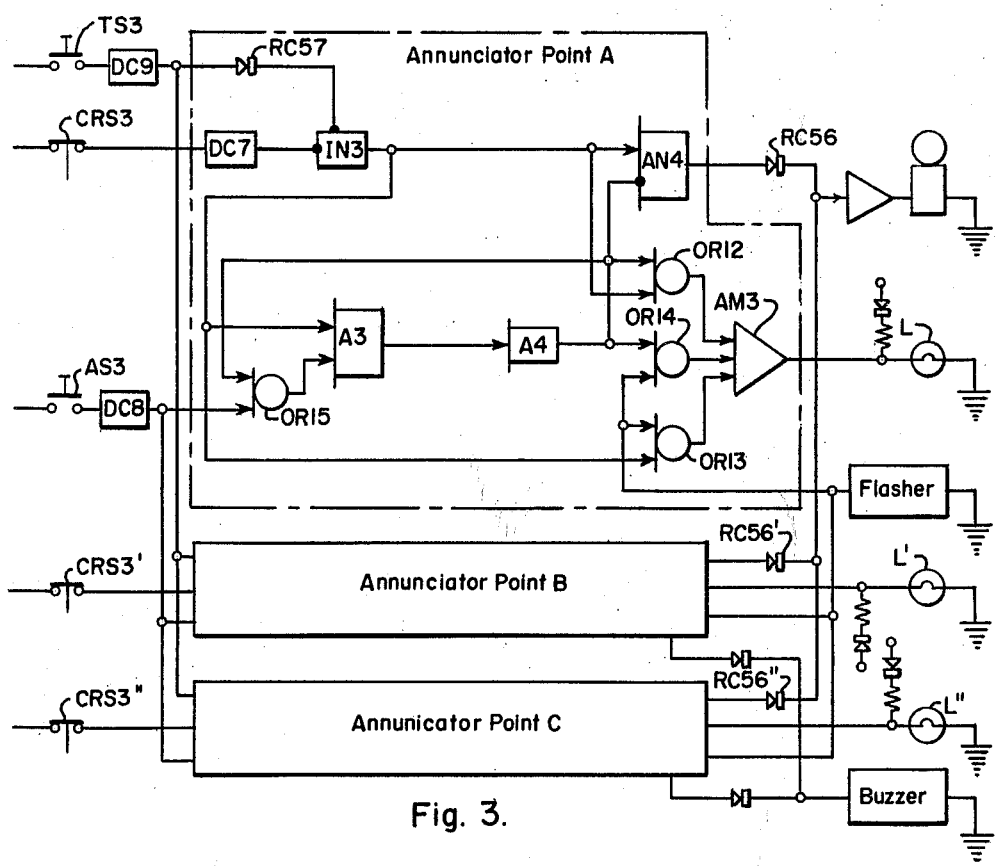
Fig. 3.

United States Patent Office 3,099,824
Patented July 30, 1963

3,099,824
STATIC LOGIC ANNUNCIATOR
Leonard P. Vitt, Pittsburgh, and Jon J. McNeill, Wilkinsburg, Pa., assignors to Westinghouse Electric Corporation, East Pittsburgh, Pa., a corporation of Pennsylvania
Filed May 26, 1958, Ser. No. 737,645
14 Claims. (Cl. 340—213)

This invention relates to annunciators of the type which embody saturable core elements or other static devices to perform the various annunciator logic functions.

An object of this invention is to provide a static logic annunciator which responds to a momentary condition to energize an indicator and a first alarm, then responds to a first acknowledge signal applied after termination of the momentary condition to deenergize the first alarm and energize a second alarm, and finally responds to a second acknowledge signal to deenergize the indicator and the second alarm.

It is another object of this invention to provide a static logic annunciator which responds to a fault to energize an alarm and an indicator, then responds to a first acknowledge signal to change the energized condition of the indicator, then responds to termination of the fault condition to make a different change in the energized condition of the indicator and at the same time to deenergize the first alarm and energize a different alarm, and finally to respond to a second acknowledge signal to restore the indicator to its initial condition and to deenergize the second alarm.

It is yet another object of this invention to provide in a static element annunciator system a retentivity circuitry operative upon restoration of power after a power failure to return the annunciator to the state of operation existing at the time of power failure.

A further object of this invention is to provide in a static element annunciator system responding to a plurality of fault responsive inputs, a means for simultaneously testing all the elements of the system through a test circuit providing simulated fault signals at all fault inputs and which test circuit at the same time maintains isolation of the individual fault inputs from each other with respect to actual fault signals.

Other objects of the invention will in part be obvious and will in part appear hereinafter.

This static logic annunciator is of the type which employs static elements to provide various logic functions which actuate audio alarms and visual indicators in response to predetermined conditions at monitored points. In this annunciator the magnetic amplifiers and other static elements provide the basic logic functions AND, OR, AND-NOT, INHIBITED-NOT, INHIBITED AND-NOT, and MEMORY.

As used in this application, a static logic AND is an element which provides an output signal only when all of a given number of input signals are present.

As used in this application, a static logic OR is an element which provides an output signal when any one of a plurality of input signals are present.

A static logic AND-NOT is an element which provides an output signal in response to one input signal, but only in the event that a second input signal is absent.

A static logic INHIBITED-NOT is an element which provides an output signal when a first input signal is absent or when the first input signal is present and a second input signal is present.

A static logic INHIBITED AND-NOT is an element which provides an output signal when a first input signal is present and when a second input signal is absent or when the first and second input signals are present and when a third input signal is present.

In the MEMORY function, sometimes identified as a FLIP-FLOP, an output occurs in response to an input, which output remains after termination of the input until the occurrence of a condition other than the change of the input condition.

This annunciator is designed to respond to digital monitors of conventional types including pressure switches, ratio switches, temperature switches, limit switches and proximity switches, all of which operate to open a contact to thus terminate an input signal to the annunciator.

The basic annunciator is comprised of an audio alarm system, a visual indicator system and an acknowledge system. When the occurrence of a predetermined condition is signalled by the monitor device, the alarm system actuates an audio alarm such as a bell or horn, and the visual system flashes or otherwise changes the illumination of a lamp or lamps. When the operator closes a momentary switch to actuate the acknowledge system, the bell or other audio alarm is deactuated and the flashing or other lamp signal is changed to a steady or other different visual signal. When the abnormal condition is corrected, the lamp is automatically turned off or dimmed. If the predetermined condition is transitory and is terminated before the acknowledge system is actuated, the annunciator returns to normal to thus silence the alarm and extinguish or dim the indicator. It is seen that a transitory abnormal condition produces transitory alarm signals and transitory indicator signals.

A lock-in system can be added to the basic system hereinbefore described. The lock-in system provides for continuous actuation of the audio alarm and continuous flashing of the lamp even though the fault caused by the presence of the predetermined condition is only transitory. The operation is otherwise identical to the basic system alone as hereinbefore described.

The previously described operation of the basic annunciator as combined with lock-in is shown in Chart I.

CHART I

| State | Sensing device | Visual alarm | Audio alarm | Acknowledge |
|---|---|---|---|---|
| 1 | Normal | Dim (or off) | Off | Off. |
| 2 | Abnormal | Flashing | On | Off. |
| 3 | Abnormal | Steady bright | Off | On (momentary). |
| 4 | Normal | Dim (or off) | Off | Off. |

A ringback system can be added to the basic system or to the combined basic system and lock-in system. The ringback system provides for a second audio alarm system for actuation of a second or different audio alarm, such as a buzzer or a bell or horn of different tone, when the predetermined condition at the monitored point is terminated. The visual indicator system is modified to return the indicator to a flashing condition simultaneously with the actuation of the second audio alarm. A second acknowledge signal applied through the same momentary acknowledge switch deenergizes both the indicator and the second alarm.

In the event of a momentary fault caused by the transitory occurrence of the predetermined condition, the visual system flashes the lamp and the first audio system energizes the first alarm. When the first acknowledge signal is provided after termination of the momentary fault, both the indicator and the first audio alarm are deenergized to return the annunciator to a normal condition.

The previously described operation of the basic annunciator as combined with ringback and lock-in is shown in Chart II.

CHART II

| State | Sensing device | Visual alarm | Audio alarm 1 | Audio alarm 2 | Acknowledge |
|---|---|---|---|---|---|
| 1 | Normal | Dim (off) | Off | Off | Off. |
| 2 | Abnormal | Flashing | On | Off | Off. |
| 3 | Abnormal | Steady bright | Off | Off | On (momentary). |
| 4 | Normal | Flashing | Off | On | Off. |
| 5 | Normal | Dim (off) | Off | Off | On (momentary). |

As described above, when the annunciator as combined with lock-in and ringback responds to a transitory fault condition the first operation of the acknowledge switch to silence the first audio alarm also returns the visual system to its normal condition. Thus, it is seen that no visual record of a transitory fault is retained after acknowledgement. In large operations where a plurality of potential trouble points are being monitored simultaneously by a plurality of annunciators combined to provide an annunciator system, it may be desirable to provide a continued visual record of transitory faults as well as continued faults to permit the operator or operators to make records of the fault conditions. At the same time it is desirable that the audio alarm be turned off immediately so that it is in readiness to signal the occurrence of another abnormal condition.

The previously described basic annunciator as combined with lock-in and ringback may be modified to respond to the two acknowledge signals even though the fault is only momentary, to provide a record of continuous faults and to ready the audio alarm to respond to another fault condition. In this modification, either a momentary fault or a continuous fault energizes the first audio alarm and flashes the visual indicator as before. When the momentary acknowledge switch is closed for the first time, and if the fault condition is still present, the bell is released and the visual indicator assumes a steady glow condition as before, that is, the annunciator will switch directly from state 2 to state 5 (Chart II) after acknowledgment. However, if the fault has disappeared when the acknowledge switch is closed for the first time, the visual indicator remains in a flashing condition and the second audio alarm is energized in a pulsating manner in time with the flashing visual indicator, that is, the annunciator will switch from state 2 to state 4 (Chart II) after acknowledgment. Thus, the termination of the fault condition and the closing of the acknowledge switch, in that order, or in reverse order, will cause the pulsating audio condition and the flashing video condition as described. Thereafter, the closing of the momentary acknowledge switch for the second time deenergizes both the second audio alarm and the visual indicator.

For a more complete understanding of the nature and scope of this invention, reference is made to the following detailed description which may be read in connection with the accompanying drawings, in which:

FIGURE 1A and FIG. 1B taken collectively comprise a schematic diagram showing the circuits of static logic elements and one way in which they may be interconnected in an annunciator embodying the invention in one of its forms;

FIG. 2 is a schematic diagram of a power supply and signal devices for operating the annunciator;

FIG. 3 is a functional schematic diagram of a modification of the annunciator of FIGS. 1A and 1B;

Figure 1B:
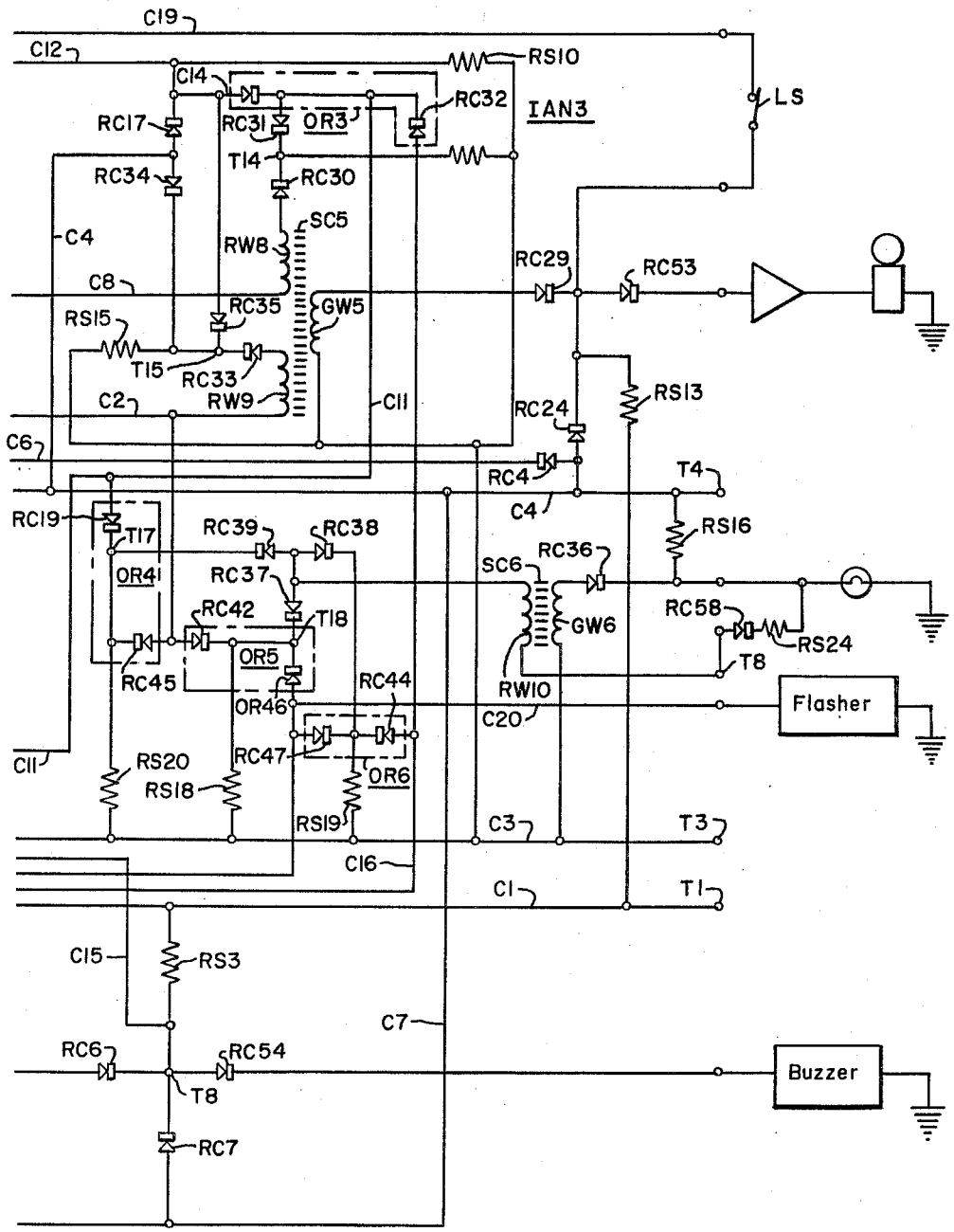

The static logic elements which perform the hereinbefore described logic functions will be individually described in order to facilitate a better understanding of the annunciator. Thereafter, the annunciator and its modifications will be described in terms of interrelationships between and among the individual static elements.

Static Logic Elements

The logic elements used in the annunciators disclosed are of the static type because they give important advantages over the relays used in prior annunciators. The static logic elements shown and described herein are made up entirely of static parts such as diodes, magnetic cores and resistors. While these particular elements, and the specific arrangements thereof, are an important part of the specific aspects of the invention; it is to be understood that the broader aspects of the invention may be utilized through the use of other arrangements of these and/or other static parts.

The use of such static logic or decision elements gives many advantages such as: (1) there are no moving parts to wear and be replaced, (2) there are no contacts in the annunciator units to burn, stick or become dirty and fail to operate, (3) the power consumption is small, (4) operation is extremely fast with momentary application of a signal for as short a time as one cycle giving the required operation of the system, and (5) the annunciator is reliable in operation and requires substantially no maintenance.

In the reference characters used in this application, the prefix A identifies a static AND element, the prefix AN identifies a static AND-NOT element, the prefix IAN identifies a static INHIBITED AND-NOT element, the prefix AM identifies a static AND amplifier element, the prefix IN identifies a static INHIBITED-NOT element, and the prefix OR identifies a static OR element. In the symbols used on the symbolic figures of the drawings, the connections to the symbols for the elements indicate the type of input to which the connection is made, by using an arrow for connections to AND inputs or OR inputs, if the element is an OR element, solid round dots for connections to NOT inputs, and solid half-round dots for connections to INHIBIT inputs.

Referring now to FIG. 1A and FIG. 1B, there is disclosed an annunciator circuit embodying each of the different static logic elements to be described. This circuit is energized and controlled from the power supply and control circuit of FIG. 2 through connections, not shown, between the terminals T1, T3, T5, etc. of FIG. 2 and the correspondingly numbered terminals of FIGS. 1A and 1B.

The first static logic element to be described is the AND element A1 including a saturable core SC1 having a gate winding GW1 and a reset winding RW1. The gate winding is energized from the transformer TR1 (FIG. 2) through terminal T1, conductor C1, gate winding GW1, rectifier RC1, to output terminal T2 taken in conjunction with a non-linear impedance including transformer TR1, terminal T3, conductor C3, resistor RS1, conductor C2, rectifier RC2, common conductor C4 and terminal T4. The reset winding RW1 is energized from transformer TR1, terminal T5, conductor C5, reset winding RW1, rectifier RC3 to input terminal T6 taken in conjunction with a non-linear impedance including transformer TR1, common terminal T4, rectifier RC4, conductor C6, rectifier RC5, terminal T6, resistor RS2, conductor C1, and terminal T1.

When transformer TR1 is energized, the gate winding GW1 of static AND element A1 will be energized from terminal T1 on alternate half cycles to produce positive saturation of the saturable core SC1. On successive half cycles following such positive saturation, the reset winding RW1 is energized from terminal T5 to produce negative saturation of the core SC1 to thus establish a reset condition. Accordingly, all the voltage from the transformer TR1 through terminal T1 will appear across winding GW1 and no effective output will appear at the output terminal T2. If a signal having the same phase as the reset voltage and having a voltage equal to or greater than the reset voltage is applied to the input terminal T6 to thus oppose the reset voltage, the flow of reset current will be blocked at terminal T6, and accordingly, on the next half cycle gating will result to provide an output through terminal T2 to conductor C2. In a system involving ganged static elements, as in the annunciators to be hereinafter described, the gating output of one static element may provide the input voltage or driving voltage to oppose the reset voltage of one or more static elements.

The function of the non-linear impedance in the reset circuit is to provide a low impedance in series with the reset voltage to thus allow the transformer voltage to completely reset the core when an opposing blocking voltage is absent, but at the same time present a high impedance to provide the least loading of the preceding driving static element when the driving static element is gating an output. The function of the non-linear impedance in the gating circuit is to assure that the output of a static element is never positive with respect to common during any gating half cycle when the core is unsaturated and subject to exciting current only. To achieve these functions, the non-linear impedance in the reset circuit is negatively biased with respect to the reset voltage on each reset cycle while the non-linear impedance in the gate circuit is negative biased with respect to the gate voltage during a gating half cycle. For a more detailed description of the function and operation of the non-linear impedance, reference is made to copending application Serial No. 640,006, filed February 13, 1957, issued June 19, 1962 as U.S. Patent 3,040,242 and assigned to the same assignee as the present application.

It is seen that for a proper operation of the static AND element A1, the reset voltage must be 180 degrees out of phase with respect to the gate voltage while the reset circuit non-linear impedance and the gating circuit non-linear impedance must each be 180 degrees out of phase with respect to their associated reset voltage and gate voltage, respectively. Transformer TR1 includes seven terminals on its secondary winding for achieving these relative phase relationships. While terminal T1, a gate voltage terminal, is positive going with respect to common terminal T4, terminal T5, a reset voltage terminal, is negative going with respect to common. Thus, these two taps may provide the alternate gate and reset half cycles for a given static element. The terminal T3 is a gate voltage tap 180 degrees out of phase with the first-mentioned gate terminal T1 and may be used to provide the 180 degree out of phase relationship between a gate voltage from terminal T1 and its associated non-linear impedance or may be used in association with the reset terminal T7 to operate a different static element having opposite phasing.

Inasmuch as the hereinafter described annunciator systems require a plurality of static elements to be arranged so that one drives another, it is necessary that an in-phase relationship exist between the gating voltage of the driving saturable core device and the reset voltage of the driven saturable core device to provide the desired blocking action. The various taps of the transformer TR1 as described above provide means for accomplishing this type of phase relationship as is seen in comparing the circuits of the individual static elements as hereinafter described. Practical values which may be used are 15 volts for the gate terminals T1 and T3 and 8 volts for the reset terminals T5 and T7. The transformer TR1 may step down the conventional 115 volts at 60 cycles to provide these gate and reset voltage values. The terminal T8 provides a reset voltage of 8 volts to the amplifier AM1 only.

The reset terminals T5 and T7 of transformer TR1 cooperate with a saturable reactor SR to provide distorted reset voltages for the various static element reset circuits. This distorted reset voltage is necessary to compensate for the distorted output voltages which result because of the failure of practical magnetic core materials to produce the theoretically desirable perfectly square hysteresis loop. This distortion is cumulative through a plurality of ganged static elements and may eventually cause the system to cease operation. The saturable reactor SR (FIG. 2) produces a reset voltage distortion similar to the gate voltage distortion to thus provide a signal which can be completely block by the distorted gate voltage of the preceding static element. For a detailed description of the structure and operation of this saturable reactor in a transformer of the type disclosed herein, reference is again made to copending application Serial No. 640,006, entitled "Magnetic Amplifier Systems," filed February 13, 1957, now issued as U.S. Patent 3,040,242 on June 19, 1962 and assigned to the same assignee as this application.

Referring again to FIGS. 1A and 1B, there is disclosed a static logic AND-NOT element AN1 including a saturable core SC2, a gate winding GW2 and two reset windings RW2 and RW3. The gate winding GW2 is energized from transformer TR1, through terminal T3, conductor C3, gate winding GW2, rectifier RC6, to output terminal T8 in conjunction with a non-linear impedance including transformer TR1, common terminal T4, conductor C7, rectifier RC7, output terminal T8, resistor RS3, conductor C1, and terminal T1. The AND reset winding RW2 is energized from transformer TR1, terminal T7, conductor C8, reset winding RW2, and is connected to each of two AND input terminals T9 and T10 through a rectifier individual to each input terminal, with each rectifier taken in conjunction with an individual non-linear impedance. Thus, rectifier RC8 connects winding RW2 to AND input terminal T9 through a non-linear impedance including the transformer TR1, terminal T4, conductor C7, rectifiers RC9 and RC40, resistor RS4, conductor C3 and terminal T3. The rectifier RC10 connects winding RW2 to AND input terminal T10 through a non-linear impedance including transformer TR1, terminal T4, conductor C4, rectifier RC2, conductor C2, rectifier RC11, resistor RS5, conductor C3 and terminal T3. The NOT reset winding RW3 is energized from the gate winding GW7 of hereinafter described INHIBITED-NOT element IN1, through winding RW3 and rectifier RC12 taken in conjunction with a non-linear impedance including transformer TR1, terminal T4, conductor C7, rectifier RC13, resistor RS6, conductor C3 and terminal T3.

With the transformer TR1 energized, the gate winding GW2 will be energized on alternate half cycles to produce positive saturation of core SC2. The reset winding RW2 will be energized on successive half cycles following positive saturation to produce negative saturation of core SC2 to thus effect reset. Accordingly, all the voltage through terminal T3 will appear across the gate winding GW2 and no effective output voltage will appear at the output terminal T8. If a signal having the same phase and voltage as the reset voltage across winding RW2, as may be provided by the gating output from another static element, be applied to both the AND terminals T9 and T10, the flow of reset current will be blocked and gating will result with the transformer voltage appearing across the output through terminal T3. If a like opposing voltage be applied to the conductor C9, reset winding RW3 is energized to produce negative saturation or reset of core SC2 whether or not an input is present at either or both of AND terminals T9 and T10, thus terminating the output from the gate circuit of AN1.

The static logic INHIBITED-AND-NOT element IAN1 includes a saturable core SC3 having a gate winding GW3, an AND reset winding RW4 and a NOT reset winding RW5. The AND reset winding RW4 is energized from transformer TR1, through terminal T7, conductor C8, winding RW4, rectifier RC14, to input terminal T11 taken in conjunction with a non-linear impedance including transformer TR1, terminal T4, conductor C4, rectifier RC2, rectifier RC15 of static OR element OR1, resistor RS7, conductor C3, and terminal T3. The OR element OR1 also includes rectifier RC41. The NOT reset winding TW5 is energized from transformer TR3, terminal T12, signal conductor C10, through winding RW5, and rectifier RC16 taken in conjunction with a non-linear impedance including transformer TR1, terminal T4, conductor C4, rectifiers RC17, RC18 and RC19, conductor C11, rectifier RC20, resistor RS8, conductor C3 and terminal T3. The gate winding GW3 is energized from transformer TR1, terminal T3, conductor C3, winding GW3, rectifier RC21 taken in conjunction with a non-linear impedance including transformer TR1, rectifier RC4, conductor C6, resistor RS9, conductor C1 and terminal T1. The INHIBITED-AND-NOT element IAN1 as described thus far is structurally and operationally the same as AND-NOT element AN1 previously described. However, INHIBITED-AND-NOT element IAN1 is provided with an additional input rectifier RC20 for passing an input signal having the same phase as that of the reset voltage and having a voltage at least equal to that of the reset NOT voltage to thus oppose the reset NOT voltage and inhibit the function of the NOT reset circuit. Accordingly, if an inhibit signal is provided in opposition to a NOT signal at the same time that an opposing AND signal is present at terminal T11, the saturable core SC3 is not reset and on the next half cycle of the transformer TR1 an output signal is gated through rectifier RC21.

The static logic INHIBITED-AND-NOT element IAN2 is structurally and operationally the same as INHIBITED-AND-NOT element IAN1 previously described and is comprised of saturable core SC4, a gate winding GW4 and two reset windings RW6 and RW7. The gate winding GW4 is energized from transformer TR1, terminal T1, conductor C1, winding GW4, conductor C12 and rectifier RC22 taken in conjunction with a non-linear impedance including transformer TR1, terminal T4, conductor C4, rectifier RC17, resistor RS10, conductor C3, and terminal T3. The reset winding RW6 is energized from transformer TR1, terminal T5, winding RW6, and rectifier RC23 taken in conjunction with a non-linear impedance including transformer TR1, terminal T4, conductor C4, rectifiers RC24 and RC25, resistor RS11, conductor C1, and terminal T1. The NOT reset winding RW7 is energized from positive input conductor C13, through winding RW7 and rectifier RC26 taken in conjunction with a non-linear impedance including transformer TR1, terminal T4, conductors C4 and C7, rectifier RC7, conductor C13, rectifier RC27 of static OR element OR2, INHIBIT input terminal T13, resistor RS12, conductor C1 and terminal T1. The static element OR2 includes rectifiers RC27 and RC28 and an output connected to INHIBIT input terminal T13 to thus provide the INHIBIT signal for the NOT signal through winding RW7.

The static INHIBITED-AND-NOT element IAN3 is structurally and operationally identical to the static elements IAN1 and IAN2 previously described and includes a saturable core SC5, a gate winding GW5, an AND reset winding RW8, and a NOT reset winding RW9. The gate winding GW5 is energized from transformer TR1, terminal T3, conductor C3, winding GW5 and rectifier RC29 taken in conjunction with a non-linear impedance including transformer TR1, terminal T4, rectifier RC24, resistor RS13, conductor C1 and terminal T1. The AND reset winding RW8 is energized from transformer TR1, through terminal T7, conductor C8, winding RW8 and rectifier RC30 to input terminal T14 taken in conjunction with a non-linear impedance including transformer TR1, terminal T4, conductor C4, rectifiers RC17, RC18 and RC31, resistor RS14, conductor C3, and terminal T3. The static OR element OR3 includes rectifiers RC18 and RC32 and an output connected to terminal T14 to provide the opposing signal to prevent reset of winding RW8. The NOT reset winding RW9 is energized from the gate winding GW1 of static AND element A1, through NOT input signal conductor C2, winding RW9 and rectifier RC33 taken in conjunction with a non-linear impedance including transformer TR1, terminal T4, conductor C4, rectifier RC34, resistor RS15, conductor C3 and terminal T3. Conductor C12 in conjunction with rectifier RC35 provides an INHIBIT input signal from the gate winding GW4 of static element IAN2 to INHIBIT input terminal T15 to oppose reset of NOT reset winding RW9.

The static AND amplifier element AM1 is structurally and operatively the same as the previously described static AND element A1 with the exception of changes such as a decrease in the number of windings on the core to change the power output. The AND amplifier AM1 includes a saturable core SC6, a gate winding GW6 and a reset winding RW10. The gate winding is energized from transformer TR1, through terminal T3, winding GW6, rectifier RC36, resistor RS16 and terminal T4. The reset winding RW10 is energized from transformer TR1, through terminal T8, winding RW10, and through any one of three rectifiers RC37, RC38, and RC39, each taken in conjunction with a corresponding non-linear impedance. Each non-linear impedance connects the winding RW10 to a different one of three AND input terminals T16, T17 and T18. Thus, rectifier RC37 connects winding RW10 to AND input terminal T18 in conjunction with a non-linear impedance including transformer TR1, terminal T4, conductor C4, rectifier RC2, conductor C2, rectifier RC42, resistor RS18, conductor C3 and terminal T3. The rectifier RC38 connects winding RW10 to AND input T16 in conjunction with a non-linear impedance including transformer TR1, terminal T4, conductor C4, rectifier RC43, conductor C16, rectifier RC44, resistor RS19, conductor C3, and terminal T3. The rectifier RC39 connects winding RW10 to terminal T17 in conjunction with a non-linear impedance including transformer TR1, terminal T4, conductor C4, rectifiers RC17, RC18 and RC19, resistor RS20, conductor C3 and terminal T3. The static OR element OR4 provides an opposing signal to prevent reset of core SC6 and includes rectifiers RC19 and RC45 having a common output coinciding with AND input terminal T17. The static OR element OR5 provides an opposing signal for preventing reset of core SC6 and includes rectifiers RC42 and RC46 having a common output coinciding with AND input terminal T16. The static OR element OR6 provides an opposing signal to prevent reset of core SC6 and includes rectifiers RC47 and RC44 having a common output coinciding with AND input terminal T16. When an opposing signal is present at all of the AND terminals T16, T17 and T18, reset of core SC6 is prevented to thus cause static element AM1 to gate an output.

The static INHIBIT-NOT element IN1 is comprised of a saturable core SC7, a gate winding GW7 and a reset winding RW11. The gate winding GW7 is energized from transformer TR1, through terminal T1, conductor C1, winding GW7 and rectifier RC48 taken in conjunction with a non-linear impedance including transformer TR1, terminal T4, conductor C4, rectifier RC43, resistor RS22, conductor C3 and terminal T3. The reset winding RW11 is energized from source terminals T20, a direct current source DC1, signal conductor C17, through winding RW11 and rectifier RC50 taken in conjunction with a non-linear impedance including transformer TR1, terminal T4, conductor C4, rectifier RC52, resistor RS23, conductor C1 and terminal T1. The INHIBIT input is provided from direct current source DC3 (FIG. 2), terminal T22, conductor C21 and rectifier RC49 to block the reset of winding RW11.

If it is desired to provide a steady dim light condition or the normal visual condition, a rectifier RC58 and resistor RS24, as shown in FIG. 1B, may be provided in series circuit relation with the lamp and a voltage source such as provided by transformer TR1 (FIG. 2) through terminal T8.

The Annunciator

Figure 5:
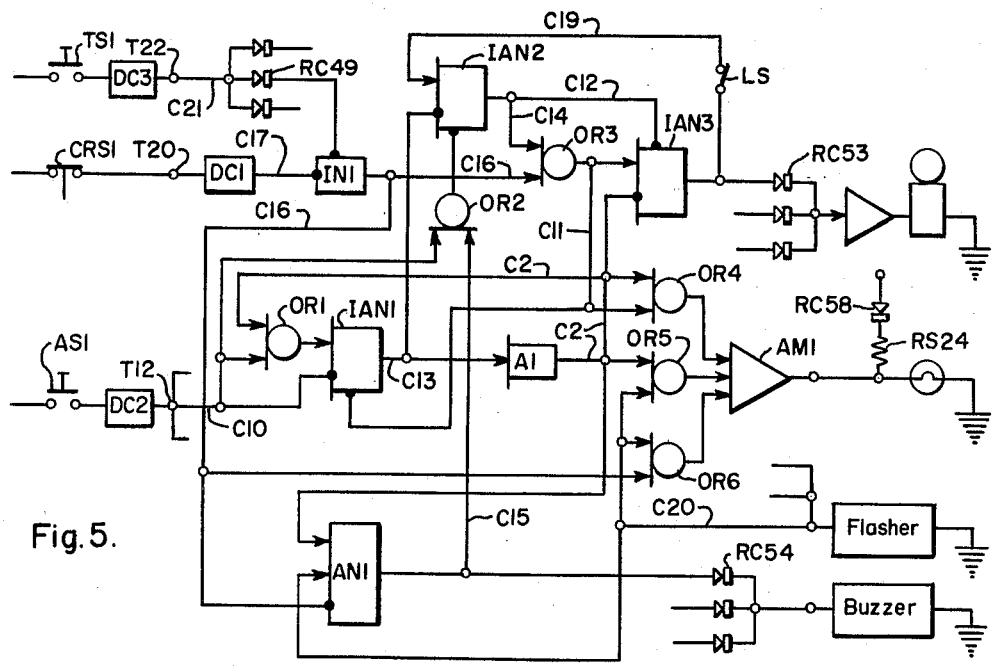
FIG. 5 is a functional schematic diagram of the annunciator of FIGS. 1A and 1B.

The hereinbefore described static logic elements are interconnected with each other and are connected with various signal switches, alarms and indicators so as to provide the hereinbefore described annunciator functions. FIG. 1A, FIG. 1B and FIG. 2 taken collectively disclose such a complete annunciator. FIG. 5 discloses in symbolic form the annunciator of FIG. 1A, FIG. 1B and FIG. 2. The reference numerals identifying the various elements in FIG. 5 are the same as the corresponding elements in FIG. 1A, FIG. 1B and FIG. 2.

Referring now to FIG. 1A, FIG. 1B, FIG. 2 and FIG. 5, there is disclosed a static element annunciator having both a lock-in system and a ringback system. The ringback system is connected to be operable for both a continuous fault and a momentary fault in the manner hereinbefore described. A normally closed condition-responsive switch CRS1 (FIGS. 2 and 5) is adapted to open in response to the occurrence of a predetermined event at a monitored point to cause the energization of an audible alarm such as a bell and the energization of an indicator such as a lamp. When the condition-responsive switch CRS1 is in the normally closed position, it connects a conventional 115 volt 60 cycle source S1 (FIG. 2) through terminals T20 to energize a direct-current source DC1 (FIG. 1A) which includes a step-down transformer TR2 and a bridge rectifier B1. The direct-current source DC1 may step-down and rectify the 115 volt A.C. to a suitable direct-current voltage such as 8 volts to serve as a driving voltage for the INHIBITED-NOT static element IN1 (FIGS. 1A and 5). Thus, a signal from source DC1 through conductor C17 resets static element IN1 to provide a no-output condition for element IN1. This no-output condition for IN1 provides a no-input condition for the remaining static elements in the annunciator and, accordingly, all the remaining static elements are reset by the hereinbefore described operation of transformer TR1 to thus provide a no-output condition for the annunciator proper. This no-output condition for the annunciator permits the alarms and indicator to remain deenergized. The annunciator is in a condition of rest.

The condition-responsive switch CRS1 opens in response to the occurrence of the predetermined event to interrupt the input signal to static element IN1 thus preventing reset of its core SC7. On the next half cycle of source S1, static element IN1 gates an output signal through conductor C16 and element OR3 to the AND input of static element IAN3 which then gates an output signal through rectifier RC53 to energize the bell amplifier and bell. The output signal from IAN3 is also provided through conductor C19 and lock-in switch LS to the AND input of static element IAN2 which then gates an output signal in one direction through conductor C14 and static element OR3 to the AND input of IAN3, and in another direction through conductor C12 to the INHIBIT input of IAN3. This INHIBIT input signal is temporarily ineffective since a NOT signal is not present at the NOT input of IAN3. It is seen that an output signal from element IN1 causes elements IAN2 and IAN3 to lock-in and continue to gate an output to energize the bell even if the condition-responsive switch CRS1 should thereafter close to terminate the output signal from element IN1. Thus element IAN2 and its accompanying conductors combine with element IAN3 to provide a MEMORY circuit serving as a lock-in system. The lock-in switch LS indicates that the lock-in feature may be disconnected or completely omitted if desired. When switch LS is opened, the termination of the output signal from element IN1 causes IAN3 to cease gating an output to thus silence the bell.

While the output signal from IN1 is energizing the bell in the manner hereinbefore described, the output signal from static element IN1 is also provided through conductor C16 and element OR6 to the first of the three AND inputs of the static amplifier element AM1. At the same time, the hereinbefore described output signal through static element OR3 is also provided through conductor C11 and static element OR4 to a second AND input of amplifier AM1. A static element flasher unit provides a pulsating output signal through conductor C20 and through each of the static elements OR5 and OR6 to the third AND input and the second AND input respectively of static element amplifier AM1. The described steady input signals through OR4 and OR6 cooperate with the pulsating input signal through OR5 to provide a periodic simultaneous blocking of all reset paths for the saturable core SC6 (FIG. 1B) of amplifier AM1 which responds to gate a periodic output signal to energize the lamp in a flashing manner. Accordingly, it is seen that the opening of the switch CRS1 energizes a bell and flashes a lamp.

The flasher element may be comprised of a static-element oscillator stage and a static-element buffer stage energized by transformer TR1 (FIG. 2) to provide an output signal through conductor C20 periodically in phase with the reset voltage across reset winding RW10 (FIG. 1B) of the amplifier AM1. This signal provides a periodic reset blocking voltage to produce the hereinbefore described pulsating output signal from amplifier AM1. Such a static-element flasher is disclosed and claimed in copending application Serial No. 706,688, filed January 2, 1958.

The previously described output signal from static element IN1 is also provided through conductor C16 to the NOT input of static element AN1 to reset its core SC2. The previously described flasher output signal is also provided through conductor C20 as an input signal to one of the two AND inputs of element AN1; however, in the absence of an input signal at the other AND input of AN1, the one AND input signal is ineffective and thus element AN1 remains in a no-output condition.

The previously described output signal from OR element OR3 is also provided through conductor C11 to the INHIBIT input of static element IAN1, which signal is ineffective in the absence of input signals at the NOT input and the AND input of IAN1.

Now that the bell is sounding and the light is energized, the operator closes acknowledge switch AS1 to cause source S1 to energize direct-current source DC2 including a step-down transformer TR3 and bridge rectifier B2 which cooperate to provide a suitable full-wave rectified voltage to drive the various static elements. A suitable voltage is 15 volts. The direct-current source DC2 provides a signal in a first direction through terminal T12, conductor C10 and static element OR1 to the AND input of static element IAN1 and in a second direction through conductor C10 to the NOT input of IAN1. The previously described INHIBIT signal from static element OR3 to the INHIBIT input of IAN1 acts to inhibit the NOT signal thus causing IAN1 to respond to the AND input signal to gate an output signal through C13 to the AND input of static element A1. Element A1 then gates an output signal in a first direction through conductor C2 and static element OR1 to the AND input of static element IAN1 to thus complete a MEMORY circuit including elements IAN1 and A1. The steady output signal from static element A1 is also provided in a second direction through each of the static elements OR4 and OR5 to two of the three AND inputs of amplifier AM1, and in a third direction to one of the two AND inputs of AND-NOT element AN1 to cooperate with the previously described temporarily ineffective AND signal from the flasher.

If it is assumed at this stage of the operation that the condition-responsive switch CRS1 is still open in response to the continuous occurrence of the predetermined condition at the monitored point, static element IN1 continues to gate an output signal to the NOT input of AN1 and to one of the AND inputs of AM1. The element AN1 accordingly remains in a no-output condition. The flashing lamp output signal from element AM1 is now changed to a steady signal because element A1 provides a steady signal through OR5 in addition to the previously described pulsating signal through OR5 from the flasher element. The above described operation of the acknowledge switch AS1 also silences the bell in a manner to be hereinafter described.

The closing of the acknowledge switch AS1 provides a MEMORY circuit between elements IAN1 and A1 in the manner hereinbefore described. In response to the operation of this MEMORY circuit, the output signal from IAN1 is provided through conductor C13 to the NOT input of IAN2 while the output signal from A1 is provided through conductor C2 to the NOT input of IAN3. These NOT inputs are respectively temporarily ineffective because the closing of the acknowledge switch AS1 provides an INHIBIT signal through conductor C10 and static element OR2 to the INHIBIT input of IAN2 and because element IAN2 provides an INHIBIT signal through conductor C12 to the INHIBIT input of IAN3. When the operator releases the switch AS1, the INHIBIT signal to element IAN2 is terminated causing the NOT input to reset IAN2 which then ceases gating an output signal to the AND input and to the INHIBIT input of IAN3. The NOT input to IAN3 from A1 is thus permitted to reset IAN3 which then ceases gating an output signal through rectifier RC53 to the alarm bell. The aforementioned release of switch AS1 also terminates the acknowledge signal at the NOT input and the AND input of IAN1; however, elements IAN1 and A1 are locked-in through OR1 and thus, they continue to provide the aforementioned NOT signals to IAN2 and IAN3 to maintain the alarm bell in a silenced condition whether or not element IN1 is gating an output through OR3.

If at this point of the operation, the monitor switch CRS1 should reclose in response to the termination of the predetermined condition at the monitored point, element IN1 ceases gating an output to the NOT input of AN1 which then responds to the steady AND input from A1 and the pulsating AND input from the flasher to energize the alarm buzzer in a pulsating manner through rectifier RC54. At the same time, the cessation of an output signal from IN1 terminates the steady input signal through OR6 to the AND input of AM1. The flasher pulsating output signal through OR6 to AM1 now cooperates with the steady signals through OR5 and OR4 to provide AM1 with a pulsating output signal to the lamp in time with the pulsating output signal to the buzzer. At the same time, the cessation of the output signal from IN1 through OR3 and conductor 11 terminates the INHIBIT signal to IAN1.

This provides what is known as ringback where an audible alarm is sounded when a monitored point returns to normal. The ringback audible signal is preferably distinctive in sound from the audible signal given when a monitored point becomes abnormal. While a bell and a buzzer have been shown by way of illustration, it will be understood that various combinations of buzzers, bells or horns, or of bells or horns of different tones may be used. When the ringback alarm indicates that some monitored point has returned to normal, the change in illumination at the lamp gives a visual indication as to which one of the plurality of monitored points has returned to normal, it being understood that various methods of giving the second visual indication may be used, such as changes to dim or bright, or flashing of the light, or changes in color by lighting or extinguishing colored lamps.

If after ringback the operator now closes the acknowledge switch AS1 for the second time, the direct current source DC2 again provides a signal to the AND input and the NOT input of IAN1; however, inasmuch as the INHIBIT signal is no longer present at the INHIBIT input of IAN1, element IAN1 ceases gating an output signal to A1 thus breaking the lock-in or MEMORY circuit between IAN1 and A1. Element A1 ceases gating an output signal through OR4 and OR5 to the respective AND inputs of AM1 which then ceases gating an output to thus extinguish the lamp. Element A1 also ceases gating an output to one of the AND inputs of AN1 which then ceases gating an output to thus silence the buzzer. The annunciator is in a condition of rest.

If the occurrence of the predetermined condition is only transitory so that the condition-responsive switch CRS1 has reclosed to terminate the output signal from IN1 before the operator closes the acknowledge switch AS1 for the first time, the alarm bell remains energized and the light remains in a flashing condition as described above because of the action of the MEMORY circuit including elements IAN2 and IAN3. The difference in operation under these conditions occurs when the acknowledge switch AS1 is closed for the first time, which switch action causes the buzzer and light to be immediately energized in a pulsating manner. This difference in operation occurs because of the difference in sequence of operation of the acknowledge switch AS1 and the condition-responsive switch CRS1. As described above, when the switch AS1 is closed, it provides first a steady input signal through OR4 and OR5 to two of the AND inputs of AM1 and secondly a steady input to an AND input of AN1. These steady AND input signals cooperate with a pulsating input signal from the flasher to provide pulsating energization of the lamp and the buzzer, unless element IN1 is gating an output signal to the NOT input of AN1 and through OR6 to the AND input of AM1. Therefore, when the switch CRS1 recloses before operation of switch AS1 provides the first acknowledge signal, the lamps flashes and the buzzer sounds without further delay. Under these conditions of transitory fault terminating before acknowledgement, the lamp never assumes a steady glow condition. After the first acknowledgement signal is provided, the condition of the annunciator is the same as that described above for a continuous signal from the condition responsive switch, and a second operation of the acknowledge switch causes the annunciator to assume the at rest condition in the same manner.

The test switch TS1 is provided to test all the logic elements and all the alarms and indicators by duplicating the signal provided by condition responsive switch CRS1. The closing of rest switch TS1 connects source S1 to energize direct-current source DC3 comprised of a step-down transformer TR4 and a bridge rectifier B3 cooperating to provide a suitable signal for driving the static elements. A suitable voltage is 15 volts. The output signal from DC3 provides a signal through terminal T22 and conductor C21 to the INHIBIT input of element IN1 preventing the NOT signal through the closed switch CRS1 from resetting its core SC7. IN1 then gates an output to actuate the remaining logic elements in the annunciator in the same fashion as hereinbefore described.

The annunciator of FIGS. 1A and 1B, FIG. 2, and FIG. 5 includes a retentive MEMORY. In the event of a power failure occurring after the condition-responsive switch CRS1 has operated to energize IAN2, IAN3 and the bell, but before acknowledgement is made, the retentive MEMORY operates to assure that this alarm condition is continued without change after the power is restored. The possibility of failure of the alarm condition to be reinstated after power restoration will arise if the power failure should occur during a gating half cycle for gate winding GW3 of element IAN1 and if the power restoration occurs so that the gate cycle is repeated. This action will cause IAN2 to gate an output signal simulating a response to an acknowledgement signal to thus terminate operation of the alarm through the application of a signal to the NOT input of IAN2 in the manner previously described. To nullify the occurrence of this false operation, the output of AN1 is connected through conductor C15 and element OR2 to the INHIBIT input of IAN2. Thus, inasmuch as element IAN1 and AN1 are connected to the same terminals T3 and T4 of the power supply, reapplication of power causing a repeated gate pulse in IAN1 will also cause a repeated gate pulse in gate winding GW2 of AN1 to thus provide a signal at the INHIBIT input of IAN2 to nullify the effect of the NOT signal. This gives the circuit a retentive MEMORY so that the annunciator gives correct indications upon restoration of power after a power outage, and this is a very desirable feature in improving the accuracy of operation under adverse conditions.

In the annunciator of FIG. 5, there has been thus far described a circuit for only a single annunciator point, with one condition-responsive switch CRS1 and one lamp responding thereto through the circuit described. As pointed out more fully hereinafter and shown in FIG. 3, there will be a plurality of such circuits each responding to a different condition-responsive device and each causing operation of its individual visual indicator. However, there would be only one test switch TS1, one acknowledge switch AS1, one bell, one buzzer, and one flasher for all or a group of the plurality of points.

The test switch TS1 would be connected through an additional assymetrically conducting device RC49, as indicated in FIG. 5, for each additional point circuit. Operation of the single test switch will thus cause operation of the static devices for the whole group of points and cause all of the lamps in the group to be flashed and cause the bell to ring. This illumination of all the lamps indicates to the operator that the static elements of each point circuit have operated properly. The connection of the single test switch TS1 through the plurality of assymetrically conducting devices RC43 individual to each point circuit, isolates the individual circuits and prevents signals from one circuit being fed into any of the others.

After the test switch has been operated and the plurality of lamps are flashing, the single acknowledge switch AS1 is closed and since it is connected to the conductor C10 of each individual point circuit at the common terminal T12, the static devices for the plurality of points will be actuated to turn off the bell, turn on the buzzer, and cause each of the plurality of lights to change from a flashing to a steady bright illumination. This shows that all of the point circuits are functioning properly in this respect.

The single acknowledge switch may then be closed a second time, and assuming that no condition-responsive switch is then closed, all of the visual indicators will change from their bright illumination to their normal condition, and the buzzer will be silenced. It is thus possible to put all of the static elements for all of the points in the group through a complete sequence of operations to determine the proper functioning of all of the components of the system by using the single common test switch and the single common acknowledge for the group of points.

As indicated in FIG. 5, the common bell and common buzzer are each connected to the plurality of annunciator point circuits through one of the plurality of the respective assymetrically conducting devices RC53 and RC54. This effectively isolates the individual point circuits from each other and prevents feedback from only one circuit into the others through the common connections to the two audio alarms.

Figure 4:
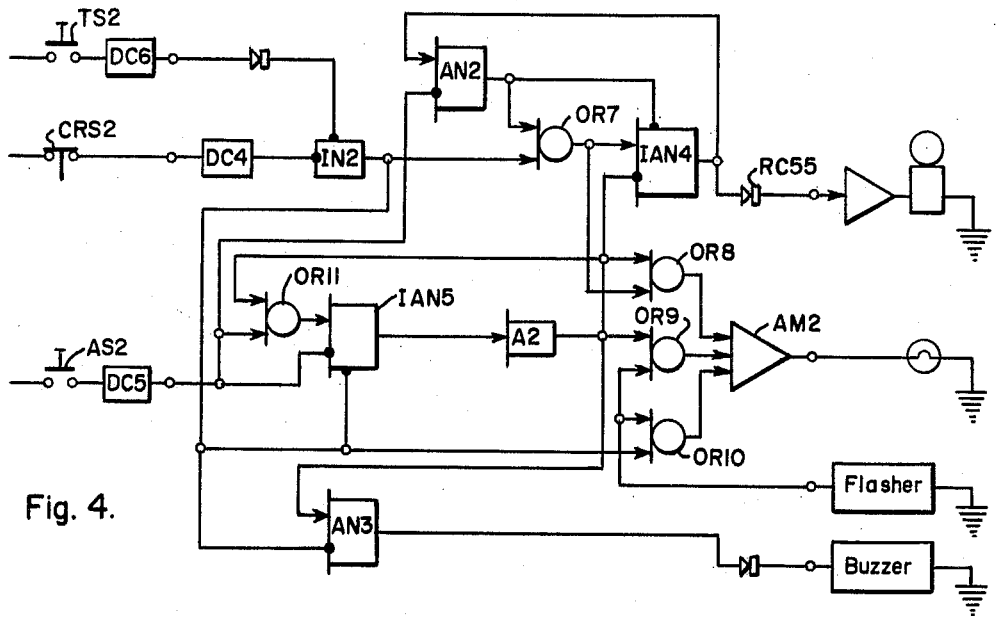
FIG. 4 is a functional schematic diagram of another modification of the annunciator of FIGS. 1A and 1B.

Referring now to FIG. 4, there is disclosed a symbolic diagram of a simplified annunciator having static elements of the same types as hereinbefore described and interconnected to provide the same type of basic annunciator system with ringback and lock-in as disclosed in the hereinbefore described FIG. 5, but showing modifications to be made to provide an annunciator that switches directly from the first condition of sounding bell and pulsating indicator to the rest condition in response to the first acknowledgement of a momentary or transitory occurrence of the predetermined event at the monitored point.

Upon the occurrence of the predetermined condition at the monitored point, the normally-closed condition-responsive switch CRS2 opens to terminate the signal through DC4 to the NOT input of IN2, causing it to gate an output signal through OR7 to the AND input of IAN4. In the absence of a signal at its NOT input, IAN4 then gates an output signal through rectifier RC55 to energize the amplifier and associated alarm bell. The output signal from IAN4 also provides an input signal to the AND input of AN2 which gates an output in a first direction to the INHIBIT input of IAN4 and in a second direction through OR7 to the AND input of IAN4 to thus provide a lock-in MEMORY circuit. This causes the audible alarm to continue to sound even though the switch CRS2 opened only momentarily because the condition was transitory.

The output signal from OR7 is also fed through OR8 to one of the AND inputs of AM2 to cooperate with a pulsating flasher output signal provided through each of OR9 and OR10 to the other two AND inputs of AM2 and to cooperate with an output signal from IN2 through OR10 to one of the AND inputs of AM2 to provide a pulsating output signal from AM2 to flash the lamp continuously even though CRS2 is operated only for a moment.

The output signal from IN2 is also provided to the INHIBIT input of IAN5 and to the NOT input of AN3, which input to IAN5 is temporarily ineffective in the absence of a NOT input signal to IAN5 and which input to AN3 is temporarily ineffective in the absence of a signal to the AND input of AN3. Thus, the second audible alarm, shown as a buzzer, does not sound.

When, under these conditions, the operator momentarily closes acknowledge switch AS2, a signal is provided through DC5 in a first direction to the NOT input of IAN5 and in a second direction through OR11 to the AND input of IAN5. This NOT signal is rendered ineffective by the previously described IN2 output signal to the INHIBIT input of IAN5, therefore, the AND input signal causes IAN5 to gate an output signal to the AND input of A2 causing A2 to gate an output signal through each of OR8 and OR9 to two of the AND inputs of AM2. The steady output signal from A2 through OR9 supplements the previously described pulsating signal from the flasher to provide a steady signal through OR9 which cooperates with the steady signals through OR8 and OR10 to cause AM2 to gate a steady output signal to the lamp.

The output signal from A2 is provided to the AND input of AN3 but is rendered ineffective by the previously described output signal from IN2 to the NOT input of AN3 as long as CRS2 remains open. The output signal from A2 is also provided to the NOT input of IAN4 but is rendered temporarily ineffective because of the presence of the previously described output signal from AN2 to the INHIBIT input of IAN4. The acknowledge signal through switch AS2 is also provided to the NOT input of AN2 causing it to cease gating an output signal to the AND input and the INHIBIT input of IAN4. This termination of the INHIBIT signal permits the NOT input signal from A2 to reset IAN4 even though IN2 is still providing a signal to the AND input. Element IAN4 now ceases gating an output to thus silence the alarm bell. Thus, in response to the acknowledge signal, the alarm bell is silenced and the lamp is caused to assume a steady glow condition.

When the condition-responsive switch CRS2 recloses in response to termination of the predetermined condition at the monitored point, element IN2 ceases gating an output signal through OR10 to an AND input of AM2 thus permitting the flasher to control the same AND input through OR10. Element AM2 now gates a pulsating output signal to flash the lamp. The cessation of output signal from IN2 also terminates the NOT input signal to AN3 thus permitting AN3 to gate an output to energize the buzzer alarm in response to the AND input signal from A2. In addition to the above, the cessation of a signal output from IN2 terminates the INHIBIT signal to IAN5, but without effect because the NOT signal disappeared with the previous opening of the switch AS2. It is seen that the reclosing of switch CRS2 after the first acknowledgement causes the lamp to return to a flashing condition and at the same time causes the buzzer alarm to sound.

When the operator closes the acknowledge switch AS2 for the second time, it again provides a NOT signal to IAN5. In the absence of the INHIBIT signal to nullify the effect of the NOT signal, IAN5 ceases gating an output signal to A2 which in turn ceases gating an output signal through OR8 and OR9 to the respective AND inputs of AM2. The lamp is now extinguished for the lack of an output from AM2. Further, A2 ceases gating an output signal through OR11 to IAN5 thus breaking the lock-in circuit between IAN5 and A2. Finally, A2 ceases gating an output signal to the AND input of AN3 which ceases gating an output to thus silence the alarm buzzer.

If the occurrence of the predetermined condition at the monitored point is transitory or momentary rather than continuous so that the condition-responsive switch CRS2 closes and reopens before the first acknowledgement signal, the alarm bell sounds and the light flashes in the same manner as described above because of the lock-in MEMORY system between AN2 and IAN4. However, inasmuch as the reclosing of the switch CRS2 eliminates the INHIBIT signal at the INHIBIT input of IAN5 as described above, the closing of the acknowledge switch AS2 for the first time provides an uninhibited NOT signal to IAN5 which maintains IAN5 and A2 in a no-output condition. Inasmuch as the first closing of the acknowledge switch AS2 also breaks the lock-in system to thus silence the alarm bell and also to terminate the output signal from OR7 to one AND input of AM2, all as described above, the light is extinguished for the lack of an input signal to the AND input of AM2 that is associated with OR8. The annunciator thus switches from the first condition of sounding bell and flashing lamp directly to the rest condition in response to the first acknowledgement of a momentary occurrence of the predetermined condition at the monitored point. The test switch TS provides a test signal through DC6 to the INHIBIT input of IN2.

The INHIBIT input to IAN4, which is provided with an input signal from AN2, is necessary to provide a retentive MEMORY in the event of a power failure. It is possible that a reapplication of power after a power failure could cause IAN5 to gate an output simulating a response to the operation of the acknowledge switch, which output signal could turn off the lock-in system through A2 and its output signal to the NOT terminal of IAN4. However, the output signal from AN2 to the INHIBIT input of IAN4 will block such a NOT signal resulting from a simulated acknowledge signal.

It will be obvious to those skilled in the art how the annunciator shown in more detail in FIGS. 1A and 1B may be modified to provide the necessary circuit details for the annunciator disclosed in symbolic form in FIG. 4.

Referring now to FIG. 3, there is disclosed a symbolic diagram similar to the annunciator as shown in FIG. 4 but showing modification to be made when the lock-in system and the ringback system are omitted. When the predetermined condition occurs at the monitored point, condition-responsive switch CRS3 opens to terminate the signal through DC7 to the NOT input of IN3 which then gates an output signal to the AND input of AN4 causing it to provide an output signal through rectifier RC56 to energize the amplifier and the alarm bell. The output signal from IN3 is also provided in a first direction through OR12 to one AND input of AM3 and in a second direction through OR13 to another AND input of AM3. A flasher provides a pulsating output signal through each of OR12 and OR14 to associated AND inputs of AM3. The steady input signals from OR12 and OR13 cooperate with the pulsating input signal from OR14 to cause AM3 to provide a pulsating output signal to flash the lamp. The output signal from IN3 is also provided to one of two AND inputs of A3, which signal is temporarily ineffective because of the absence of a signal to the other AND input of A3. If at this point of the operation the condition-responsive switch CRS3 recloses, the above-described action between the static elements is reversed to silence the bell and extinguish the light.

It is assumed the condition-responsive switch CRS3 now remains open to continue energizing the alarm bell and flashing the light. When the acknowledge switch AS3 is momentarily closed by the operator, an acknowledge signal is provided through DC8 and OR15 to the second AND input of A3 which then gates an output signal to the AND input of A4. The element A4 gates an output signal in a first direction to the NOT input of AN4 causing it to cease gating an output to thus silence the bell. The output signal from A4 is provided in a second direction through each of OR12 and OR14 to corresponding AND inputs of AM3. The steady signal thus provided through OR14 supplements the previously described pulsating signal therethrough to thus cooperate with the steady signals through OR12 and OR13 to cause AM3 to provide a steady output signal for the lamp. The output signal from A4 is also provided through OR15 to the acknowledge signal AND input A3 to provide a lock-in MEMORY circuit between A4 and A3, which circuit continues operation after release of switch AS3 to thus maintain the alarm bell in a silenced condition and to maintain the lamp in a steady glow condition.

When the switch CRS3 recloses after the described operation of acknowledge switch AS3, a signal is again provided to the NOT input of IN3 causing it to cease gating an output signal to one of the AND inputs of A3. Thus, the lock-in MEMORY circuit between A3 and A4 is broken and accordingly A4 ceases gating an output signal through OR12 and OR14. The lack of a signal from OR12 permits AM3 to reset and thus extinguish or otherwise change the illumination of the lamp. The test switch TS3 provides a signal through DC9 to the INHIBIT input of IN3.

A composite annunciator system may be constructed comprising a plurality of annunciators of the different types as hereinbefore described, each annunciator responding to one particular point or monitored variable and each having its individual visual indicator. FIG. 3 discloses an annunciator system including annunciator points A, B and C having individual lamps L, L' and L", and having individual condition-responsive switches CRS3, CRS3' and CRS3", respectively. The annunciators may otherwise be connected to a common power supply (of the general type shown in FIG. 2) to energize the static elements, a common bell, a common acknowledge switch AS3 and a common flasher unit for flashing the visual signal as described above. In addition, the annunciators may be connected in common to a single test switch TS3 for applying a test signal to duplicate a fault or abnormal condition signal. In such a test circuit, a rectifier is connected to each annunciator between the test switch and the INHIBITED-NOT element in a manner similar to rectifier RC57 to isolate each point and its monitor from all the other points but at the same time allows simultaneous testing of all the logic indicators and alarms at all points. Annunciators B and C may be identical to annunciator A in which case they will have the same outputs as annunciator A or they may be similar to the annunciators of FIG. 4 or FIG. 5 in which case they will each have an additional output to a common buzzer as shown.

Each of the annunciator static element units as shown boxed in FIG. 3 may be encapsulated in a container having plug-in terminals on one end to releasably connect the annunciator in each container to one of the plural plug-in positions in a power track, which power track connects the plug-in units to the above described common annunciator elements. The other end of each container may have terminals connecting its respective annunciator to its individual condition responsive switch and individual indicator lamp. For a detailed disclosure of such a composite annunciator system including a power track and plug-in containers, reference is again made to the copending application Serial No. 706,688, filed January 2, 1958.

From the above description and the accompanying drawings it will be apparent that there is provided a static-logic annunciator that is compact, efficient and reliable in operation.

Inasmuch as certain changes may be made in the above construction without departing from the scope of the invention, it is intended that all matter contained in the above description or shown in the accompanying drawings shall be illustrative only.

We claim as our invention:

1. An annunciator comprising static element means operating to change a normal indication signal to another indication signal in response to the absence of a signal from a condition-responsive signal means; acknowledge means connected in circuit relation with said static element means for providing an additional signal to said static element means in the absence of a signal from said condition-responsive means, and additional static element means connected in circuit relation with said acknowledge means and said static element means for providing an indication signal different from said normal indication signal and said another indication signal in response to the operation of the acknowledge means following the said operation of the first mentioned static means and to the presence of a signal from said condition-responsive signal means after the operation of the acknowledge means.

2. An annunciator comprising first static element means normally providing a first indication output condition and operable to provide a second indication output condition in response to the absence of a signal from a condition-responsive signal means; acknowledge means connected in circuit relation with said static element means for providing an additional acknowledge signal to said static element means in the absence of a signal from said condition-responsive means, additional static element means connected in circuit relation with said static element means and said acknowledge means for providing a third indication output condition in response to the operation of said static element means, to the operation of the acknowledge means and to the absence of said signal from said condition-responsive signal means; further static element means connected in circuit relation with said first static and said additional static element means for providing a fourth indication output condition in response to the operation of said first static element means, to the operation of said additional static element means, and to the presence of a signal from the condition-responsive means after the operation of the acknowledge means; said first, second, third and fourth output conditions being different from each other.

3. An annunciator comprising first static element means including input means and having a normal output, said first static means being operable to provide a first output in response to the absence of a first input signal and providing a second output in response to the presence of a second input signal during or after the absence of said first input signal, said first static means including additional means for continuously providing a third output; condition-responsive switch means connected in circuit relation with the input means of said static means providing said first input signal only during normal conditions; acknowledge means connected in circuit relation with the input means of said static means operable to provide said second signal; further static element means connected in circuit relation with said first static means providing a fourth output in response to the presence of said second output signal, to the presence of said third output, and to the presence of said first input signal.

4. An annunciator comprising an indicator, condition-responsive means normally providing a signal and operable to terminate the signal during the occurrence of an abnormal condition; first static element means having an input connected in circuit relation with said condition-responsive means and having a normal reset output connected in circuit relation with said indicator and operable to provide a different output signal to actuate said indicator in response to the operation of said condition-responsive means; acknowledge means connected in circuit relation with said first static element means for providing an additional signal; additional static element means connected in circuit relation with said first static element means and said acknowledge means having a normal output condition and operable to effect an alarm output condition different from said normal output condition and said different output condition to actuate an alarm in response to said operation of said first static element means, to the termination of operation of said condition-responsive means, and to the additional signal from said acknowledge means; said first static element means and said additional static element means being operable to return to their respective normal output conditions in response to an additional operation of said acknowledge means and the continued termination of operation of said condition-responsive means.

5. An annunciator comprising an indicator, first static element means connected in circuit relation with said indicator normally effecting a reset output condition, said static element means having inputs and having an output to provide a first output signal to actuate an indicator in response to the presence of a first input signal at one of said inputs and having an additional output to provide a second output signal to actuate an alarm condition different from said normal condition in response to the presence of another input signal at another of said inputs when said another input signal is applied during or after the presence of said first input signal and when the presence of said first input signal at a further one of said inputs is terminated; and additional static means connected in circuit relation with said first static element means and adapted to provide said first input signal in response to the operation of a condition-responsive means normally providing a signal and operable to terminate the signal in response to the occurrence of an abnormal condition.

6. An annunciator comprising an indicator, first static element means connected in circuit relation with said indicator having inputs and having an output normally providing a normal output condition and operable to provide another output condition at said output to provide a first output signal to actuate an indicator in response to the presence of a first input signal at one of said inputs and having an additional output to provide a second output signal to effect an alarm output condition different from the before said output condition in response to the presence of another input signal at another of said inputs when said another input signal is applied during or after the presence of said first input signal and when the presence of said first input signal at a further one of said inputs is terminated; and additional static means connected in circuit relation with said first static element means and adapted to provide said first input signal in response to the operation of a condition-responsive means, said additional static means including a NOT input responsive to the operation of said condition-responsive means.

7. An annunciator comprising an indicator, first static element means having inputs and having an output connected in circuit relation with said indicator for normally providing a normal output condition and operable to provide another output condition at said output to provide a signal to actuate said indicator in response to the presence of a first input signal at one of said inputs and having an additional output to provide a signal to effect an alarm output condition different from the aforesaid output condition in response to the presence of another input signal at another of said inputs when said another input signal is applied during or after the presence of said first input signal and when the presence of said first input signal at a further one of said inputs is terminated; and additional static means connected in circuit relation with one of the inputs of said first static element means for providing said first input signal in response to the operation of a condition-responsive means, said additional static means consisting of an INHIBITED-NOT element having an INHIBIT input and a NOT input; said condition-responsive means being connected to said NOT input; and means connected in circuit relation with the INHIBIT input of said INHIBITED-NOT element for providing a test signal to said INHIBIT input.

8. An annunciator comprising an indicator, first static element means connected in circuit relation with said indicator for providing a pulsating output signal to actuate said indicator in response to the presence of at least a first signal, a second signal, and a pulsating signal or in response to the presence of at least a third signal and said pulsating signal and the absence of said second signal, said static element means being operable to provide a steady output signal to actuate said indicator in response to the presence of at least said second signal and said third signal; lock-in means connected in circuit relation with said first static element means and comprised of static elements for providing said first signal in response to said second signal; signal generating means connected in circuit relation with said first static element means and including condition-responsive switch means normally providing a condition signal and operable to terminate the condition signal during the occurrence of an abnormal condition; a static NOT element providing said second signal in response to operation of the condition-responsive means; additional static element means connected in circuit relation between said condition-responsive switch means and said first static element means for providing said third signal and for providing an acknowledge output signal in response to the presence of an acknowledge signal and the presence of said first signal; further static element means connected in circuit relation with said first static element means and with said additional static element means for providing an output signal to provide a pulsating alarm signal in response to the presence of said acknowledge output signal, to the presence of said pulsating output signal, and to the absence of said second signal.

9. In an annunciator system: a plurality of indicators; a circuit individual to each one of said plurality of indicators; said individual circuits consisting of static elements and each having an output connected to one of the indicators; a plurality of signal devices; a plurality of static INHIBITED-NOT elements each having a NOT input connected to one of said signal devices and each having an output; said individual circuits each having an input connected to respond to a signal at the output of one of said INHIBITED-NOT elements to change the energization of the circuit output to the corresponding indicator; a common test circuit having a plurality of outputs each connected to the INHIBIT input of one of said static INHIBITED-NOT elements; and means in each of said test circuit ouputs to prevent each signal device from changing the energization of any input other than the input of its individual circuit.

10. In an annunciator: a static NOT element having an input for responding to a signal from a condition responsive device and having an output; a first static OR element having an input connected to the output of said NOT element and having an output; a static INHIBITED-AND-NOT element having an AND input connected to the output of said first OR element, and having an output for controlling an alarm; a static AND-NOT element having an AND input connected to the output of said INHIBITED-AND-NOT element and having an output connected to another input of said first OR element and to the INHIBIT input of the INHIBITED-AND-NOT element; a three input static AND element having an output for controlling an indicator; a second static OR element having an output connected to the first input of the three input AND element, and having one input connected to the output of the first OR element; a third static OR element having inputs and having an output connected to a second input of the three input AND element; a fourth static OR element having one input connected to the output of the NOT element and having an output connected to a third input of the three input AND element; means providing a varying signal and having an output connected to another input of the fourth OR element and one input of the third OR element; a single input static AND element having an input and having an output connected to another input of the third OR element, another input of the second OR element, and the NOT input of the first INHIBITED-AND-NOT element; a second INHIBITED-AND-NOT element having an IN-HIBIT input connected to the output of the NOT element and having an output connected to the input of the single input AND element; a fifth static OR element having an output connected to the AND input of the second IN-HIBITED-AND-NOT element and having one input connected to the output of the single input AND element; means for providing an acknowledge signal and having an output connected to the NOT input of the AND-NOT element, another input of the fifth OR element, and the NOT input of the second INHIBITED-AND-NOT element; a second static AND-NOT element having an AND input connected to the output of the single input AND element, having a NOT input connected to the output of the NOT element, and having an output for controlling a second alarm.

11. In an annunciator: a NOT magnetic amplifier having an input for responding to a signal from a condition responsive device and having an output; a first static OR element having an input connected to the output of said NOT element and having an output; an INHIBITED-AND-NOT magnetic amplifier element having an AND input connected to the output of said first OR element, and having an output for controlling an alarm; and AND-NOT magnetic amplifier having an AND input connected to the output of said INHIBITED-AND-NOT magnetic amplifier and having an output connected to another input of said first OR element and to the INHIBIT input of the INHIBITED-AND-NOT magnetic amplifier; a three input AND magnetic amplifier having an output for controlling an indicator; a second static OR element having an output connected to the first input of the three input AND magnetic amplifier and having one input connected to the output of the first OR element; a third static OR element having inputs and having an output connected to a second input of the three input AND magnetic amplifier; a fourth static OR element having one input connected to the output of the NOT magnetic amplifier and having an output connected to a third input of the three input AND magnetic amplifier; means providing an intermittent signal and having an output connected to another input of the fourth OR element and one input of the third OR element; a single input AND magnetic amplifier having an input and having an output connected to another input of the third OR element, another input of the second OR element, and the NOT input of the first INHIBITED-AND-NOT magnetic amplifier; a second INHIBITED-AND-NOT magnetic amplifier having an INHIBIT input connected to the output of the NOT magnetic amplifier and having an output connected to the input of the single input AND magnetic amplifier; a fifth static OR element having an output connected to the AND input of the second INHIBITED-AND-NOT magnetic amplifier and having one input connected to the output of the single input AND magnetic amplifier; means for providing an acknowledge signal and having an output connected to the NOT input of the AND-NOT magnetic amplifier, another input of the fifth OR element, and the NOT input of the second INHIBITED-AND-NOT magnetic amplifier; a second static AND-NOT magnetic amplifier having an AND input connected to the output of the single input AND magnetic amplifier, having a NOT input connected to the output of the NOT magnetic amplifier, and having an output for controlling a second alarm.

12. In an annunciator: a static NOT element having an input for responding to a signal from a condition responsive device; and having an output; a first static OR element having an input connected to the output of said NOT element and having an output; a static INHIBITED-AND-NOT element having an AND input connected to the output of said first OR element, and having an output for controlling an alarm; a second static INHIBITED-AND-NOT element having an AND input connected to the output of said INHIBITED-AND-NOT element and having an output connected to another input of said first OR element and to the INHIBIT input of the first mentioned INHIBITED-AND-NOT element; a three input static AND element having an output for controlling an indicator; a second static OR element having an output connected to the first input of the three input AND element and having one input connected to the output of the first OR element; a third static OR element having inputs and having an output connected to a second input of the three input AND element; a fourth static OR element having one input connected to the output of the NOT element and having an output connected to a third input of the three input AND element; means providing an intermittent signal and having an output connected to another input of the fourth OR element and one input of the third OR element; a single input static AND element having an input and having an output connected to another input of the third OR element, another input of the second OR element, and the NOT input of the first INHIBITED-AND-NOT element; a third INHIBITED-AND-NOT element having an INHIBIT input connected to the output of the first OR element and having an output connected to the input of the single input AND element and the NOT input of the second INHIBITED-AND-NOT element; a fifth static OR element having an output connected to the AND input of the third INHIBITED-AND-NOT element and having one input connected to the output of the single input AND element; a sixth static OR element having inputs and having an output connected to the INHIBIT input of the second INHIBITED-AND-NOT element; means for providing an acknowledge signal and having an output connected to one input of the sixth OR element, another input of the fifth OR element, and the NOT input of the third INHIBITED-AND-NOT element; a static AND-NOT element having an AND input connected to the output of the single input AND element having a second AND input connected to the output of the intermittent signal means, having a NOT input connected to the output of the NOT element, and having an output connected to another input of the sixth OR element and adapted to be connected to control an additional alarm.

13. In an annunciator: a static NOT magnetic amplifier having an input for responding to a signal from a condition responsive device; and having an output; a first static OR element having an input connected to the output of said NOT magnetic amplifier and having an output; a static INHIBITED-AND-NOT magnetic amplifier having an AND input connected to the output of said first OR element, and having an output for controlling an alarm; a second magnetic amplifier INHIBITED-AND-NOT magnetic amplifier having an AND input connected to the output of said INHIBITED-AND-NOT magnetic amplifier and having an output connected to another input of said first OR element and to the INHIBIT input of the first mentioned INHIBITED-AND-NOT magnetic amplifier; a three input static AND magnetic amplifier having an output for controlling an indicator; a second static OR element having an output connected to the first input of the three input AND magnetic amplifier and having one input connected to the output of the first OR element; a third static OR element having inputs and having an output connected to a second input of the three input AND magnetic amplifier, a fourth static OR element having one input connected to the output of the NOT magnetic amplifier and having an output connected to a third input of the three input AND magnetic amplifier; means providing an intermittent signal and having an output connected to another input of the fourth OR element and one input of the third OR element; a single input static AND magnetic amplifier having an input and having an output connected to another input of the third OR element, another input of the second OR element, and the NOT input of the first INHIBITED-AND-NOT magnetic amplifier; a third INHIBITED-AND-NOT magnetic amplifier having an INHIBIT input connected to the output of the first OR element and having an ouput connected to the input of the single input AND magnetic amplifier and the NOT input of the second INHIBITED-AND-NOT magnetic amplifier; a fifth static OR element having an output connected to the AND input of the third INHIBITED-AND-NOT magnetic amplifier and having one input connected to the output of the single input AND magnetic amplifier; a sixth static OR element having inputs and having an output connected to the INHIBIT input of the second INHIBITED-AND-NOT magnetic amplifier; means for providing an acknowledge signal and having an output connected to the one input of the sixth OR element, another input of the fifth OR element, and the NOT input of the third INHIBITED-AND-NOT magnetic amplifier; a static AND-NOT magnetic amplifier having an AND input connected to the output of the single input AND magnetic amplifier having a second AND input connected to the output of the intermittent signal means, having a NOT input connected to the output of the NOT magnetic amplifier, and having an output connected to another input of the sixth OR element and adapted to be connected to control an additional alarm.

14. An annunciator comprising a static INHIBITED-NOT element having an output, an INHIBIT input, and having a NOT input adapted for connection to respond to a condition responsive means; circuit means connected in circuit relation with the INHIBIT input of said static INHIBITED-NOT element for providing a test signal to the INHIBIT input of the INHIBITED-NOT element; and static element means connected to said output of said static INHIBITED-NOT element and adapted to provide a control output signal to operate an indicator in response to operation of the INHIBITED-NOT element.

References Cited in the file of this patent

UNITED STATES PATENTS

| | | |
|---|---|---|
| 2,817,074 | Faulkner | Dec. 17, 1957 |
| 2,824,295 | Zaruba | Feb. 18, 1958 |
| 2,825,894 | Marmorstone | Mar. 4, 1958 |
| 2,832,948 | Deer et al. | Apr. 29, 1958 |
| 2,858,528 | Diener | Oct. 28, 1959 |
| 2,931,018 | Tellefsen et al. | Mar. 29, 1960 |